United States Patent [19]

McDaniel et al.

[11] Patent Number: 5,075,394

[45] Date of Patent: Dec. 24, 1991

[54] OLEFIN POLYMERIZATION USING SUPPORTED PENTADIENYL DERIVATIVE-TRANSITION METAL COMPLEXES

[75] Inventors: Max P. McDaniel, Bartlesville, Okla.; Paul D. Smith, Seabrook, Tex.

[73] Assignee: Phillips Petroleum Company, Bartlesville, Okla.

[21] Appl. No.: 534,658

[22] Filed: Jun. 7, 1990

[51] Int. Cl.$^5$ .................. C08F 4/646; C08F 4/68; C08F 4/62

[52] U.S. Cl. .................. 526/96; 502/103; 502/117; 502/132; 502/152; 502/154; 526/126; 526/127; 526/129; 526/130; 526/131; 526/132; 526/154; 526/155; 526/156; 526/160; 526/170; 526/348.2; 526/352

[58] Field of Search .............. 526/131, 154, 160, 170, 526/113, 114, 116, 126, 127, 129, 130, 132, 155, 156, 96

[56] References Cited

U.S. PATENT DOCUMENTS

| | | | |
|---|---|---|---|
| 3,090,776 | 5/1963 | Alelio | 260/93.7 |
| 3,432,530 | 3/1969 | Mulheim | 260/429 |
| 3,502,635 | 3/1970 | Halson | 260/94.3 |
| 3,732,198 | 5/1973 | Whiteley et al. | 260/94.9 |
| 4,011,383 | 3/1977 | Setterquist | 526/154 |
| 4,808,561 | 2/1989 | Welborn | 526/129 X |
| 4,871,704 | 10/1989 | Kohara et al. | 526/124 X |
| 4,897,455 | 1/1990 | Welborn | 526/160 X |

OTHER PUBLICATIONS

J. W. Freeman, D. R. Wilson, R. D. Ernst, P. D. Smith, D. D. Klendworth and M. P. McDaniel, Ethylene Polymerization Over Organochromium Catalysts: A Comparison Between Closed and Open Pentadienyl Ligands, *J. Polymer Science-Polymer Chemistry*, vol. 25, 2063–2075 (1987).

E. A. Benham, P. D. Smith, E. T. Hsieh and M. P. McDaniel, Mixed Organo/Oxide Chromium Polymerization Catalysts, *J. Macromolecules, Science-Chemistry*, A25(3), 259–283 (1988).

Primary Examiner—Patrick P. Garvin
Attorney, Agent, or Firm—Laney, Dougherty, Hessin & Beavers

[57] ABSTRACT

Olefin polymerization catalysts, processes for preparing the catalysts and processes for producing polyolefins utilizing the catalysts are provided. The catalysts are basically comprised of a pentadienyl derivative-transition metal complex adsorbed on an activated inorganic refractory compound.

14 Claims, No Drawings

OLEFIN POLYMERIZATION USING SUPPORTED PENTADIENYL DERIVATIVE-TRANSITION METAL COMPLEXES

BACKGROUND OF THE INVENTION

1. Field of the Invention

The present invention relates to olefin polymerization with catalysts comprised of supported pentadienyl derivative-transition metal complexes, and more particularly, to supported pentadienyl derivative-transitional metal catalysts, their preparation and use for polymerizing olefins.

2. Description of the Prior Art

A great variety of olefin polymerization catalysts have been developed and used heretofore. Such catalysts can be broadly classified into three groups: the Ziegler-Natta catalysts of the type described in Belgium Patent 533,362 issued in 1954; the Phillips Petroleum Company silica supported chromium catalysts of the types described in U.S. Pat. Nos. 2,825,721 issued in 1958, 2,846,425 issued in 1958, 2,951,816 issued in 1960, 3,887,494 issued in 1975, 4,119,569 issued in 1978 and 4,151,122 issued in 1979; and the supported organo-transition metal catalysts of the types described in U.S. Pat. Nos. 3,709,853 issued in 1973, and 3,806,500 issued in 1974, and U.S. Pat. Nos. 3,840,508 issued in 1974 and 4,018,707 issued in 1977.

The supported organo-transition metal catalysts include organo chromium complexes such as bis-($\eta$-cyclopentadienyl) chromium, bis-($\eta^6$-arene) chromium, tri-($\eta^3$-allyl) chromium and tetrakis-($\eta^3$-allyl) dichromium supported on inorganic oxide refractory compounds such as silica, alumina, zirconia and thoria. Another class of supported organo-metallic catalysts is comprised of tetravalent titanium and zirconium compounds of the formula $ML_nX_4$—n wherein M is titanium or zirconium, L is $-CH_2C_6H_5$, $-CH_2Si(CH_3)_3$ or $-C_3H_5$, and X is chlorine or bromine supported on inorganic oxides. In the use of the various organo-transition metal catalysts, the particular transition metal, the organic ligands and the inorganic refractory supports used all influence the properties of the resulting polymers.

By the present invention, novel supported pentadienyl derivative-transition metal olefin polymerization catalysts are provided, the use of which results in the production of polymers having different properties from the polymers produced using prior art catalysts.

SUMMARY OF THE INVENTION

The present invention provides novel supported pentadienyl derivative-transition metal catalysts, processes for producing such catalysts and processes for using the catalysts for polymerizing olefins. The catalysts are comprised of transition metals of Groups IV B, V B and VI B of the Periodic Table of the Elements complexed with pentadienyl derivatives and supported on activated inorganic refractory compounds. Preferred transition metals are titanium, vanadium, zirconium, cerium and hafnium, and a preferred pentadienyl derivative is bis-(2,4-dimethylpentadienyl). The activated inorganic refractory compounds are preferably selected from inorganic oxides and metal phosphates. The most preferred inorganic oxides are those which are commercially available such as silica and alumina. The most preferred metal phosphates are the alumino-phosphates.

A supported pentadienyl derivative-transition metal catalyst of the present invention is prepared by activating an inorganic refractory compound, and then contacting the activated inorganic refractory compound with a pentadienyl derivative-transition metal complex under conditions whereby the complex is adsorbed on the refractory compound.

In preparing polyolefins using a supported pentadienyl derivative-transition metal catalyst of this invention, one or more olefins are contacted with a catalytic amount of the catalyst at polymerization conditions. The olefins are preferably ethylene alone or ethylene and a minor amount of a higher olefin, and the catalyst is preferably a bis-(2,4-dimethylpentadienyl) titanium, vanadium, or zirconium complex supported on an inorganic oxide or metal phosphate. The polymerization process is preferably conducted under particle forming conditions at temperatures in the range of from about 60° C. to about 110° C. and pressures in the range of from about 250 psig to about 1000 psig.

It is, therefore, a general object of the present invention to provide novel supported pentadienyl derivative-transition metal catalysts, processes for preparing such catalysts and processes for polymerizing olefins using the catalysts.

Other and further objects, features and advantages of the present invention will be readily apparent to those skilled in the art upon a reading of the description of preferred embodiments which follows.

DESCRIPTION OF PREFERRED EMBODIMENTS

The present invention provides olefin polymerization catalysts comprised of complexes of pentadienyl derivatives and Groups IV B, V B and VI B transition metals supported on inorganic refractory compounds.

The pentadienyl derivative ligands useful in forming the transition metal complexes are comprised of pentadienyl substituted with alkyl radicals having from 1 to 4 carbon atoms. Examples of such ligands are 3-methylpentadienyl, 2-n-butylpentadienyl and 2,4-dimethylpentadienyl. The most preferred such ligand is 2,4-dimethylpentadienyl.

The transition metal complexes are comprised of two identical substituted pentadienyl ligands with a transition metal atom therebetween as shown by the following structural formula:

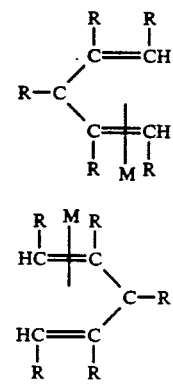

wherein each R is hydrogen or an alkyl radical having from 1 to 4 carbon atoms or a silyl radical of the formula $-SiR^1_3$ wherein $R^1$ is an alkyl radical having 1 to 4 carbon atoms, and M is a Group IV B, V B or VI B transition metal. Preferably, the transition metal is selected from titanium, vanadium, zirconium, cerium and hafnium.

Examples of pentadienyl derivative-transition metal complexes which are particularly suitable for use in accordance with this invention are bis-(pentadienyl) titanium, vanadium and zirconium; bis-(3-methylpentadienyl) titanium, vanadium and zirconium; and bis-(2,4-dimethylpentadienyl) titanium, vanadium and zirconium. Other examples are bis-(2,4-dimethylpentadienyl) cerium, bis-(2,4-dimethylpentadienyl hafnium, bis-(2,4-dimethylsilylpentadienyl) zirconium and bis-(2,4-dimethylsilylpentadienyl) vanadium. The most preferred pentadienyl derivative-transition metal complexes are bis-(2,4-dimethylpentadienyl) titanium, vanadium and zirconium.

The various pentadienyl-metal complexes described above can be prepared by known methods utilizing conventional techniques. For example, the preparation of pentadienyl derivative-titanium complexes is described in the *Journal of the American Chemical Society*, 1982, 104, 3737-3739, and the preparation of pentadienyl derivative-vanadium and chromium complexes is described in *Journal of the American Chemical Society*, 1982, 104, 1120-1122.

The inorganic refractory compounds most suitable for supporting the above described complexes are inorganic oxides and metal phosphates. Examples of preferred inorganic oxides are alumina, boria, silica, titania, zirconia and combinations thereof. Particularly preferred such compounds which are commercially available are alumina and silica. Suitable metal phosphates include the alumino-phosphates, e.g., aluminum orthophosphate, pyrophosphate and polyphosphates, alone or in combination with alumina. The most preferred metal phosphates are the aluminophosphates. The supports can also be modified by the addition of fluorides, phosphates and phosphites as known in the art.

In preparing the supported pentadienyl derivative-transition metal catalysts of the invention, an activated inorganic refractory compound is contacted with a pentadienyl derivative-transition metal complex under conditions whereby the complex is adsorbed on the refractory compound. Generally, the activated support compound is impregnated with about 0.1 to about 2 millimoles (mmoles) of the pentadienyl derivative-metal complex dissolved in an organic solvent under dry, air-free conditions. The catalysts so prepared can be washed several times with a hydrocarbon such as n-pentane and charged to a reactor in slurry form, or they can be dried and used as free flowing powders.

The inorganic refractory compounds utilized as supports for the pentadienyl derivative-metal complexes are generally activated by calcining the compounds in air at elevated temperatures, e.g., temperatures in the range of from about 300° C. to about 800° C., for time periods of from about one-half hour to about twenty-four hours. The calcining procedure can be accomplished in a fluidized bed which, after being heated at the temperature and for the time mentioned above, is cooled to a temperature in the range of from about 40° C. to about 50° C. The air is then displaced from the fluidized bed by dry argon or nitrogen followed by cooling to room temperature. The calcined support compounds can be stored under the inert gas in closed containers until ready for use.

Thus, the process of the present invention for preparing an olefin polymerization catalyst of the invention, i.e., a pentadienyl derivative-transition metal complex supported on an inorganic refractory compound, is comprised of the steps of activating the inorganic refractory compound, generally by calcining it in air, and then contacting the activated inorganic refractory compound with the pentadienyl derivative-transition metal complex under conditions whereby the complex is adsorbed on the refractory compound.

The supported pentadienyl derivative-transition metal catalysts of the present invention can be employed in various olefin polymerization processes wherein one or more olefin monomers, generally having from about 2 to about 8 carbon atoms is contacted with a catalytic amount of the catalyst under polymerization conditions. Preferably, the olefin monomers are comprised of ethylene alone or ethylene and a minor amount of a higher olefin, e.g., propylene. The polymerization reaction is preferably carried out under slurry (particle forming) conditions. The reaction medium can be a dry inert hydrocarbon such as isobutane, n-heptane, methylcyclohexane or benzene and the polymerization reaction is carried out at a reactor temperature within the range of from about 60° C. to about 110° C. and a reactor pressure of from about 250 psig to about 600 psig. The polyolefin produced can be recovered, treated with carbon dioxide or water, for example, to deactivate residual catalyst, stablized with an antioxident such as butylated hydroxy toluene (BHT), and dried by conventional methods to obtain the final product. Hydrogen can be used in the reactor as known in the art to provide some control of the molecular weight of the polymer.

The process can include the first step of contacting an activated inorganic refractory compound with a pentadienyl derivative-transition metal complex under conditions whereby the complex is adsorbed on the inorganic refractory compound thereby forming a supported catalyst, followed by the step of contacting one or more olefins with a catalytic amount of the catalyst at polymerizing conditions to form the polyolefins.

In order to further illustrate the novel organo-metal catalysts of this invention as well as their preparation and use, the following examples are given. The particular components utilized in the examples are meant to be illustrative of the present invention and not limiting thereto.

EXAMPLE I

Bis-(2,4-dimethylpentadienyl) metal complexes of Ti and V were synthesized by first converting 2,4-dimethyl-1,3-pentadienyl to the potassium salt by reaction with well dispersed metallic potassium in a tetrahydrofuran (THF) medium in the presence of triethylamine to inhibit polymerization. The metal complex was then formed by slowly adding a THF solution of the 2,4-dimethylpentadienyl anion to a cooled ($-50°$ C.) suspension of the appropriate metal halide in THF. After warming to room temperature the THF was removed under vacuum and the product was extracted from the residue with n-pentane. The procedures employed are detailed below.

2,4-Dimethylpentadienylpotassiumtetrahydrofuranate, (DMPD)K.THF 3.0 g. (77 mmole) of finely divided potassium were suspended in 30 ml of dry THF under argon. 15 ml of absolute triethylamine (dried over $CaH_2$) were added and the suspension was cooled to 0° C. 18 ml (139 mmole) of 2,4-dimethyl-1,3-pentadiene were added dropwise over a period of at least one hour. After warming to room temperature, the clear yellow solution was refluxed under argon for several hours. The solution was then filtered, diluted with two parts pentane and stored at $-30°$ C. to induce crystallization. The resulting orange needles were washed with dry n-pentane and dried in vacuum for several hours at room temperature. Yield: 10 g. (49 mmol, 71%) of (DMPD)K.THF.

Bis-(2,4-dimethylpentadienyl)titanium, $(DMPD)_2Ti$ 3.34 g (10 mmole) of $TiCl_4(THF)_2$ were suspended in 100 ml of dry THF under argon. 0.24 g (10 mmole) of activated magnesium was then added and the mixture was stirred for 12 hours after which time a black suspension of $TiCl_2(THF)_2$ was observed. After cooling to $-78°$ C., a solution of 4.12 g (20 mmole) of (DMPD)K.THF in 50 ml of dry THF was added dropwise through an addition funnel over a one hour period. After an additional hour, the reaction mixture was allowed to warm to room temperature. At this point, the dark green solution was evaporated to dryness and the residue extracted several times with 50 ml portions of dry n-pentane. The combined extracts were filtered over a small amount (2 g) of silica gel. Removal of the solvent yielded 1.6 g (6.8 mmole, 68%) of the dark green oil, $(DMPD)_2Ti$. A 0.13 M stock solution of the product was then prepared by adding 50 ml of dry n-pentane.

Bis-(2,4-dimethylpentadienyl)vanadium, $(DMPD)_2V$ 2.7 g (7.2 mmole) of $VCl_3(THF)3$ were suspended in 100 ml of dry THF. 0.24 g (3.6 mmole) of zinc dust were added and the mixture was refluxed for 2 hours, until a light green suspension was obtained. After cooling to $-78°$ C., a solution containing 3.0 g (14.4 mmole) of (DMPD)K.THF in 30 ml of dry THF was added dropwise over a one hour period. After warming to room temperature, the reaction mixture was worked up as in the preceding example. Yield: 1.2 g (5 mmole, 70%) of $(DMPD)_2V$.

Catalyst Preparation

With the exception of the unsupported vanadium catalyst described hereinbelow, the catalysts were prepared by supporting the above described pentadienyl complexes on activated inorganic oxide refractory compounds.

The inorganic oxide supports employed included Ketjen Grade B alumina, a Davison Co. alumina product, having a pore volume of about 1.7 cc/g and surface area of about 320 m²/g; Davison Co. high pore volume alumina having a pore volume of about 2 cc/g and surface area of about 540 m²/g; and Davison Co. grade 952 silica having a pore volume of about 1.6 cc/g and surface area of about 300 m²/g. In addition to the commercially available oxides, several experimental supports were used including aluminum orthophosphate (P/Al atom ratio of 0.9) having a pore volume of about 0.8 cc/g and surface area of about 350 m²/g and a phosphated alumina, $P/Al_2O_3$, prepared by treating the high pore volume $Al_2O_3$ (previously calcined at 300° C.) with a methanol solution of $H_3PO_4$ at the concentration needed to provide a P/Al atom ratio of 0.1. Excess methanol was removed by suction filtration and the composite was dried in a vacuum oven at 80° C. for 12 hours. All supports were activated for 3 hours at 600° C. in dry air except the silica which was activated for 3 hours in dry air at 700° C.

The various catalysts tested were prepared by transferring approximately 1.0 g. of the activated support utilized to a Schlenk tube under argon. A total of 5 ml (0.65 mmole) of the stock solution of pentadienyl derivative-metal complex used was added, and the slurry agitated until all of the complex was absorbed as noted by the complete decolorization of the green solution. The resulting brown catalyst was then washed several times with pentane and charged to the reactor either as a toluene slurry or as a free flowing powder after drying in a warm nitrogen stream.

Polymerization Conditions

All polymerization runs were carried out in a modified two liter bench reactor under slurry (particle form) conditions. The diluent was isobutane and the reactor temperature was varied between 85° C. and 105° C. Reactor pressure was held at 550 psig during the polymerization with ethylene being fed on demand.

In a series of runs, ethylene was polymerized with a known quantity of each catalyst, e.g., ranging from about 20 to about 150 mg, in the stirred, stainless steel reactor containing about 567 g of isobutane as diluent and hydrogen, when used. A nominal reactor pressure of about 565 psia (3.89 MPa) was employed with ethylene was supplied from a pressurized reservoir as needed during each run to maintain the pressure. Generally, a run time of about 60 minutes was used at the indicated reactor temperature. A triethylaluminum cocatalyst was required with the vanadium catalysts, particularly when hydrogen was used to regulate the molecular weight of the polymer. In addition in the vanadium catalyst systems with hydrogen present, a halocarbon activator (adjuvant) was found to be needed to obtain catalytic activity.

In run 15 of Table 1B, an unsupported vanadium catalyst was used. It was formed by treating 1 ml of a $(DMPD)_2V$ solution (0.1M in pentane) with 2 ml of 1,2-difluorotetrachloroethane ($C_2F_2Cl_4$) under argon. The emerald green color gradually faded and a fine brownish-colored precipitate formed. Ethylene was bubbled through the suspension for about 5 minutes at atmospheric pressure resulting in polymer coated catalyst particles. The particles were separated by filtration, washed several times with n-pentane and dried at room temperature under vacuum, yielding 1.3 g of polymer coated catalyst particles. In run 15 of Table 1B 0.12 g of the "prepolymer catalyst" was charged to the reactor and used in combination with 0.75 mmole of triethylaluminum (TEA) to polymerize ethylene.

The results obtained are presented in Tables 1A and 1B below. In the Tables, the significance of the abbreviations and the test methods employed in determining the physical properties of the polymers are as follows:

Calculated productivity (g/g/hr) is based on grams polymer per gram solid catalyst per hour.

Melt index (MI), g/10 minutes - ASTM D 1238, condition E.

High load melt index (HLMI), g/10 minutes - ASTM D, condition F.

Density, g/cc - ASTM D 1505.

Flexural modulus (Flex Mod), MPa - ASTM D 790.

Melt viscosity (MV) M poise - Melt viscosity data are obtained by means of a Rheometrics Dynamic Spectrometer (RDS) at 230° C. using parallel plate geometry. Strain amplitude is 1% (or 5%), nitrogen gas is used in the sample chamber and the oscillatory frequency can be varied from 0.1 to 500 radians/second. From these data in turn can be calculated dynamic complex viscosity/$\eta^*$/ as described in Chapter 1 of the "Viscoelastic Properties of Polymers", by Terry, published in 1961 by Wiley. The values obtained are directly related to molecular weight, with the higher the value the higher the molecular weight. It has been shown for a commercially available ultra high molecular weight polyethylene (UHMWPE) (Hostalen GUR, American Hoechst) that /$\eta^*$/, when determined at 1% strain and 0.1 radian/second at 230° C. has a value of about 39. Higher values then indicate even higher molecular weight polymers have been made.

In the presence of reactor hydrogen, the activity of the Ti catalysts declines and the V catalysts are deactivated altogether. However, some activity of the V catalysts can be restored by the addition of a halocarbon activator to the reactor as shown in run 14 of Table 1B.

The melt index response to hydrogen with the catalysts is dependent upon the metal of the complex, the support, and the activation temperature of the support. The Ti catalysts have very low hydrogen response since only fractional HLMI polymers were made. The V catalysts, in contrast, have a good hydrogen response, and consequently, a range of melt indicies can be obtained by adjusting the hydrogen concentration in the reactor.

TABLE 1A

Ethylene Polymerization with (DMPD)$_2$Ti Catalysts

| Run No. | Support | Run Temp °C. | Reactor Hydrogen psi | Calculated Productivity g/g/hr | MI/HLMI g/10 min | Density g/cc | Flex Mod. MPa | MV MPoise |
|---|---|---|---|---|---|---|---|---|
| 1 | Al$_2$O$_3$[a] | 96 | 0 | 5700 | 0/0 | 0.932 | 806 | 65 |
| 2 | Al$_2$O$_3$[a] | 96 | 50 | 6000 | 0/0 | 0.946 | 1114 | 20 |
| 3 | Al$_2$O$_3$[a] | 96 | 100 | 4000 | 0/0.01 | 0.946 | 1145 | —[d] |
| 4 | Al$_2$O$_3$[a] | 85 | 0 | 1600 | 0/0 | 0.932 | 769 | 72 |
| 5 | Al$_2$O$_3$[a] | 105 | 0 | 2300 | 0/0 | 0.931 | 785 | 37 |
| 6 | Al$_2$O$_3$[b] | 96 | 50 | 3100 | 0/0.02 | 0.944 | 1038 | — |
| 7 | Al$_2$O$_3$[b] | 96 | 100 | 900 | 0/0.06 | 0.954 | 1279 | 4.4 |
| 8 | P/Al$_2$O$_3$[c] | 96 | 0 | 4000 | 0/0 | 0.934 | 872 | 54 |
| 9 | AlPO$_4$ | 96 | 0 | 200 | 0/0 | — | — | — |
| 10 | SiO$_2$ | 96 | 0 | 100 | 0/0 | — | — | — |

[a]Ketjen Grade B alumina.
[b]Davison high pore volume alumina.
[c]Phosphated high pore volume alumina.
[d]A dash signifies not determined.

TABLE 1B

Ethylene Polymerization with (DMPD)$_2$V Catalysts, 96° C.

| Run No. | Support | Reactor Hydrogen psi | Calculated Productivity g/g/hr | MI/HLMI g/10 min | Density g/cc | Flex Mod. MPa | MV MPoise |
|---|---|---|---|---|---|---|---|
| 11 | Al$_2$O$_3$[a] | 0 | 1000 | 0/0 | 0.933 | 924 | —[d] |
| 12[b] | Al$_2$O$_3$ | 0 | 1400 | 0/0 | 0.932 | 845 | 89 |
| 13[b] | AlPO$_4$ | 0 | 2600 | 0/0 | 0.933 | 873 | 63 |
| 14[b] | AlPO$_4$ | 50 | 700 | 11/770 | 0.971 | 1769 | — |
| 15 | None | 0 | 144000[c] 2720[e] | 0/0 | 0.926 | 602 | 124 |

[a]Ketjen Grade B alumina.
[b]Run with 0.03 mmole TEA and 2 mmoles C$_2$F$_2$Cl$_4$ as reactor adjuvants.
[c]Calculated productivity based on grams polymer/gram vanadium.
[d]A dash signifies not determined.
[e]Based on the polymer coated catalyst, calculated productivity is 2720 g/g/hr.

The productivity results given in Tables 1A and 1B show that the bis-(2,4-dimethylpentadienyl) metal complexes of Ti and V, when supported on inorganic oxides, particularly alumina, phosphated alumina and aluminum phosphate, are active ethylene polymerization catalysts. Silica and aluminum phosphate are not as effective as alumina for supporting the complexes of Ti and are not usually employed when such complexes are used. In general, the supported Ti complexes exhibit higher activities than the corresponding V complexes.

In the absence of reactor hydrogen all of the polymers produced with the supported catalysts had zero regular melt indicies and high load melt indicies ranging from zero to 0.06. Such values are indicative of very high molecular weight polymers. Based on melt viscosity values of 37–89M poise, for polymers made with the Ti and V complexes, the polymers in fact are in the ultrahigh molecular weight range. The commercially available UHMWPE (Hostalen GUR) mentioned above has a value of 39M poise under the same test conditions.

EXAMPLE II

The catalysts of the present invention were compared with catalysts comprised of supported organo-chromium compounds selected from bis($\eta^5$-cyclopentadienyl)chromium and the zerovalent complexes bis($\eta^6$-cumene)chromium and bis($\eta^6$-mesitylene)-chromium. The comparison catalysts were prepared in the same manner as described above. That is, a hydrocarbon solution of the organo-chromium compound was impregnated on the activated support in a dry, oxygen-free atmosphere. The resulting complex, after washing, was employed in slurry form or as a dry, free flowing powder in ethylene polymerizations as described above.

The ethylene polymers produced with the supported catalysts were recovered and stabilized as above. Their structural properties were determined by means of infrared spectroscopy, $^{13}$C-NMR spectroscopy and size exclusion chromatography (SEC). The $^{13}$C-NMR spectra were obtained at 125° C. with a Varian XL-200 NMR spectrometer. The molecular weight data were obtained with a SEC unit (Du Pont 830 instrument).

The results are set forth in Tables 2A, 2B and 2C below.

TABLE 2A

End Group Characterization by Infrared Spectroscopy

| Run No. | Metal Complex | Support | Terminal Vinyl Groups Per 1000 C | Methyl Groups Per 1000 C | vinyl/methyl Ratio |
|---|---|---|---|---|---|
| 1 | (DMPD)$_2$V | AlPO$_4$ | 0.3 | 0.7 | 0.43 |
| 2[b] | (DMPD)$_2$V | AlPO$_4$ | 0.5 | 3.8 | 0.13 |
| 3[a] | (CP)$_2$Cr | AlPO$_4$ | 0.05 | 3.8 | 0.01 |
| 4 | (CUM)$_2$Cr | AlPO$_4$ | 4.2 | 5.7 | 0.74 |
| 5[a] | (CUM)$_2$Cr | AlPO$_4$ | 4.3 | 6.4 | 0.67 |
| 6 | (DMPD)$_2$Ti | Al$_2$O$_3$ | 0.2 | 0.6 | 0.33 |
| 7[b] | (DMPD)$_2$Ti | Al$_2$O$_3$ | 0.4 | 0.9 | 0.44 |
| 8[c] | (DMPD)$_2$Ti | Al$_2$O$_3$ | 0.3 | 0.9 | 0.33 |

[a]10 psi H$_2$ in reactor.
[b]50 psi H$_2$ in reactor.
[c]100 psi H$_2$ in reactor.

TABLE 2B

Branching Configuration By $^{13}$C-NMR Spectroscopy

| Run No. | Metal Complex | Support | Reactor Hydrogen psi | Unsat./[a] sat. | Methyl Branches | Longer[b] Branches | Total Branches |
|---|---|---|---|---|---|---|---|
| 10 | (DMPD)$_2$V | AlPO$_4$ | 50 | 0 | .06 | .04 | .10 |
| 11 | (CUM)$_2$Cr | P/Al$_2$O$_3$ | 0 | .50 | .10 | .24 | .34 |
| 12 | (CP)$_2$Cr | P/Al$_2$O$_3$ | 10 | 0 | .32 | none | .32 |
| 13 | (CP)$_2$Cr | P/Al$_2$O$_3$ | 50 | 0 | .51 | none | .51 |

[a]Ratio of terminal vinyl to methyl end groups.
[b]Ethyl and butyl.

TABLE 2C

Molecular Weight By SEC

| Run No. | Metal Complex | Support | Low MW Component Wt. %[a] | Low MW Component MW$_{max}$ | High MW Component Wt. %[a] | High MW Component MW$_{max}$ | Total Polymer[b] M$_n$ | Total Polymer[b] M$_w$ | Total Polymer[b] HI |
|---|---|---|---|---|---|---|---|---|---|
| 14 | (DMPD)$_2$V | AlPO$_4$ | 0 | — | 100 | 18700 | 6900 | 73,800 | 10.7 |
| 15 | (CP)$_2$Cr | AlPO$_4$ | 0 | — | 100 | 65800 | 26800 | 131,000 | 4.9 |
| 16 | (MES)$_2$Cr | AlPO$_4$ | 50 | 1400 | 50 | 23100 | 2560 | 77,600 | 30.3 |

[a]The relative weight percent and MW$_{max}$ values of the low and high molecular weight components were calculated from the integrated peak intensity (accum. wt. %) and the peak maxima respectively.
[b]M$_n$ is number average molecular weight. M$_w$ is weight average molecular weight. HI is heterogeneity index which is the value obtained by dividing M$_w$ by M$_n$. The larger the HI value, the broader the molecular weight distribution of the polymer.

The results set forth in Tables 2A, 2B and 2C show that polymers with significant differences in short chain branching, end group unsaturation and molecular weight distribution are obtained using the supported pentadienyl derivative-metal catalysts of this invention as compared to those obtained using supported prior art catalysts.

EXAMPLE III

Other catalysts of the present invention were prepared using procedures similar to the procedures of Example 1 and using other metal chlorides (M=Zr, V, Ce) and another pentadienyl ligand 1,5-trimethylsilyl pentadienyl, according to the following equations:

ZrCl$_4$+4[1,5-(SiMe$_3$)$_2$C$_5$H$_5$]K
→Zr[1,5-(SiMe$_3$)$_2$C$_5$H$_5$]$_2$

VCl$_2$+2[1,5-(SiMe$_3$)$_2$C$_5$H$_5$]K→V[1,5-(SiMe$_3$)$_2$C$_5$H$_5$]$_2$

CeCl$_{13}$+3[2,4-Me$_2$C$_5$H$_5$]K→Ce[2,4-Me$_2$C$_5$H$_5$]$_2$

Catalysts were then made by depositing these compounds from a toluene solution onto Ketjen Grade B alumina which had been calcined previously in nitrogen at 600° C.

Polymerization runs utilizing the above described catalysts were carried out and the properties of the polymers formed were determined as described in Example I above. The results are given in Table 3 below.

TABLE 3

Ethylene Polymerization With Various Supported Pentadienyl-Transition Metal Complexes

| Pentadienyl-Metal Complex | Structural Formula | Support Compound | Reactor Hydrogen (psi) | Calculated Productivity g/g metal/hr | Wt. % Metal on Support | MI | HLMI |
|---|---|---|---|---|---|---|---|
| Bis-(2,4-dimethylsilyl-pentadienyl) zirconium | 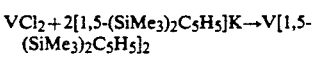 | Al$_2$O$_3$ | 0 | 3590 | 1.4 | 0 | 0 |
| Bis-(2,4-dimethylsilyl-pentadienyl) vanadium |  | Al$_2$O$_3$ | 0 | 645,000 | 0.077 | 0 | 0 |

TABLE 3-continued
Ethylene Polymerization With Various Supported Pentadienyl-Transition Metal Complexes

| Pentadienyl-Metal Complex | Structural Formula | Support Compound | Reactor Hydrogen (psi) | Calculated Productivity g/g metal/hr | Wt. % Metal on Support | MI | HLMI |
|---|---|---|---|---|---|---|---|
| Bis-(2,4-dimethylsilyl-pentadienyl) vanadium | 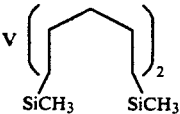 | Al₂O₃ | 10 | 368,000 | 0.077 | 0 | 0 |
| Bis-(2,4-dimethylpentadienyl) cerium | Ce(DMPD)₂ | Al₂O₃ | 0 | 1051 | 2.75 | 0 | 0 |

[1] Ketjen Grade B alumina

The productivity results given in Table 3 show that the various catalysts tested, and particularly Bis-(2,4-dimethylsilyl-pentadienyl) vanadium, are active ethylene polymerization catalysts.

Thus, the present invention is well adapted to carry out the objects and attain the ends and advantages mentioned as well as those inherent therein. While numerous changes in components, procedures and process steps may be made by those skilled in the art, such changes are encompassed within the spirit of this invention as defined by the appended claims.

We claim:

1. A process for preparing polyolefins comprising contacting one or more olefins with a catalystic amount of a pentadienyl derivative-transition metal complex supported on an inorganic refractory compound at polymerization conditions, said pentadienyl derivative-transition metal complex being selected from the group represented by the structural formula:

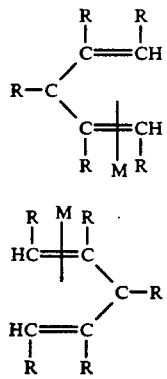

wherein each R is hydrogen, a methyl radical or a silyl radical of the formula —SiR¹₃ wherein R¹ is a methyl radical, and M is a transition metal selected from titanium, vanadium, zirconium, cerium and hafnium.

2. The process of claim 1 wherein said olefins are comprised of ethylene alone or ethylene and a minor amount of a higher olefin.

3. The process of claim 2 wherein said higher olefin is 1-hexene.

4. The process of claim 1 wherein said pentadienyl derivative-transition metal complex is selected from the group consisting of bis-(2,4-dimethylpentadienyl) titanium, vanadium and zirconium and bis-(2,4-dimethylsilylpentadienyl) zirconium and vanadium.

5. The process of claim 1 wherein said inorganic refractory compound is selected from the group consisting of inorganic oxides and metal phosphates.

6. The process of claim 4 wherein said inorganic refractory compound is an inorganic oxide selected from the group consisting of alumina, boria, silica, titania, zirconia and combinations thereof.

7. The process of claim 4 wherein said inorganic refractory compound is an alumino-phosphate.

8. The process of claim 1 which is conducted under particle forming condition at a temperature in the range of from about 60° C. to about 110° C. and a pressure in the range of from about 250 psig to about 1000 psig.

9. A process for preparing polyolefins comprising the steps of:
(a) contacting an activated inorganic refractory compound with a pentadienyl derivative-transition metal complex selected from the group consisting of bis-(2,4-dimethylpentadienyl) titanium, vanadium, and zirconium and bis-(2,4-dimethylsilylpentadienyl) zirconium and vanadium under conditions whereby said complex is adsorbed on said inorganic refractory compound thereby forming a supported organo-metal catalyst; and
(b) contacting one or more olefins with a catalytic amount of said supported organo-metal catalyst at polymerizing conditions thereby forming said polyolefins.

10. The process of claim 9 wherein olefins are comprised of ethylene alone or ethylene and a minor amount of 1-hexene.

11. The process of claim 9 wherein said inorganic refractory compound is selected from the group consisting of inorganic oxides and metal phosphates.

12. The process of claim 9 wherein said inorganic refractory compound is an inorganic oxide selected from the group consisting of alumina, boria, silica, titania, zirconia and combinations thereof.

13. The process of claim 9 wherein said inorganic refractory compound is an alumino-phosphate.

14. The process of claim 9 which is conducted under particle forming conditions at a temperature in the range of from about 60° C. to about 110° C. at a pressure in the range of from about 250 psig to about 600 psig.

* * * * *